Jan. 12, 1932.   H. C. NYCUM   1,841,145
REGULATOR SYSTEM
Filed Jan. 23, 1930
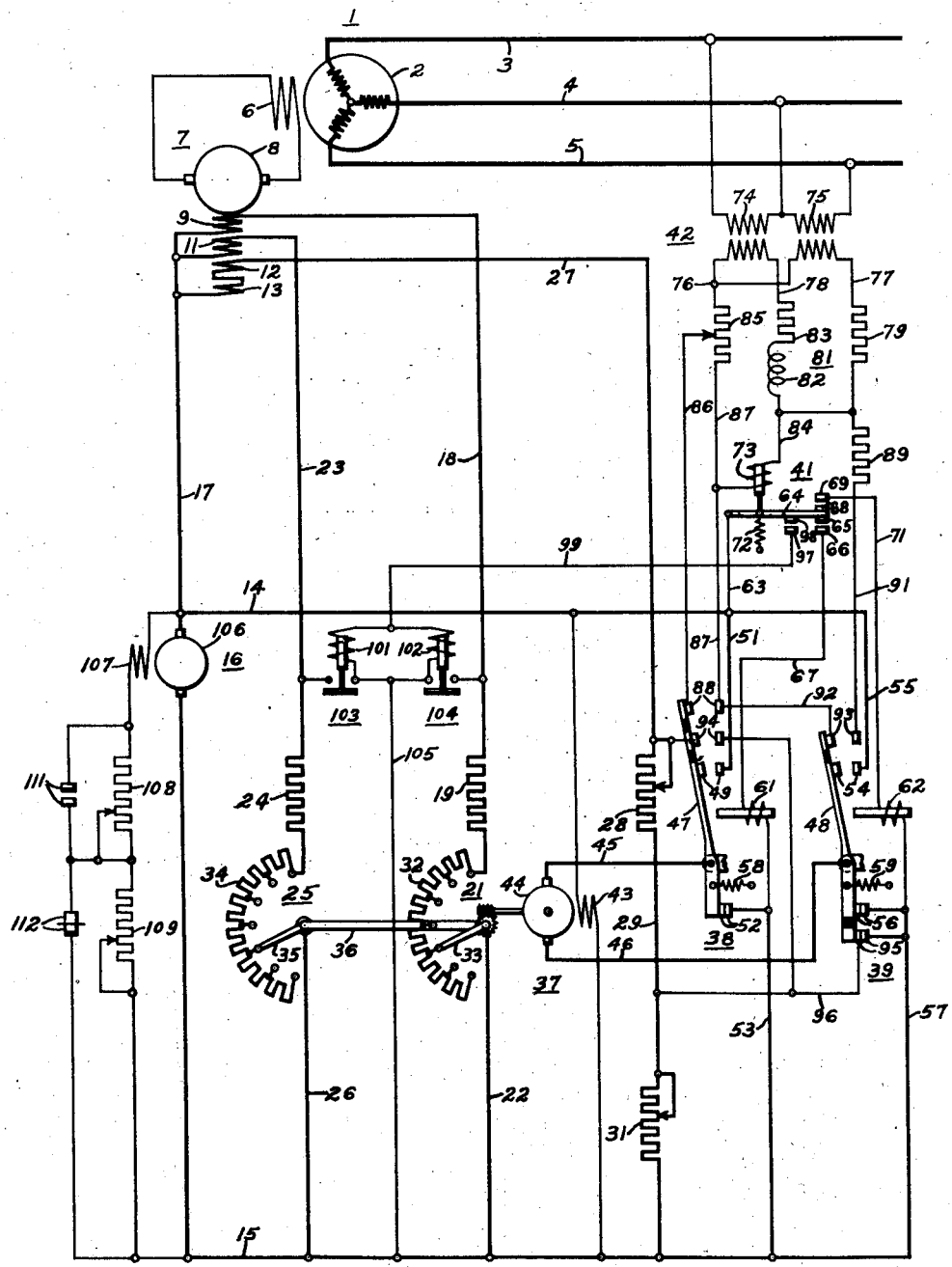
INVENTOR
Homer C. Nycum
BY
ATTORNEY Patented Jan. 12, 1932

1,841,145

UNITED STATES PATENT OFFICE

HOMER C. NYCUM, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed January 23, 1930. Serial No. 422,769.

My invention relates to regulator systems and more particularly to regulator systems of the rheostatic type for varying the excitation of a dynamo-electric machine.

In regulator systems of the rheostatic type, it is usual to provide a motor-operated rheostat in the main field winding of a dynamo-electric machine and to control the operation of the rheostat motor by a regulator that is energized in accordance with the quantity that it is desired to maintain at a predetermined value. Because of the inductance of the field windings of the machine, there is a time lag between a change in the resistance of the field-winding circuit and the new value of field current that will eventually result therefrom.

Where high-speed excitation is required, it is possible to force the field of the dynamo-electric machine temporarily, such as during the operation of the rheostat, in the one or the other direction. Because of the relatively large amount of energy that is stored in the main field windings of the machine and the high-voltage surges and arcing that may result from an attempt to too suddenly change the amount of this stored energy, it is undesirable to abruptly vary the energization of the main field winding at frequent intervals, except during abnormal power-circuit conditions.

I have provided a regulator system in which the main field windings are aided by auxiliary field windings having a lesser number of ampere turns, thus storing a smaller amount of energy. Means are provided for abruptly varying the excitation of the auxiliary field-winding circuit, in the one or in the other direction, during the operation of the regulator. When very large variations in the regulated quantity occur, it may also be desirable to abruptly vary the energization of the main field windings. This will, however, be at infrequent intervals.

My invention will be better understood by reference to the accompanying drawing in which the single figure is a diagrammatic view of apparatus and circuits organized in accordance with my invention.

Referring to the drawing, a dynamo-electric machine 1 is provided, having an armature winding 2 that is connected to the power-circuit conductors 3, 4, 5, and a field winding 6 that is connected to be energized from the exciter generator 7. The exciter generator comprises an armature winding 8, main field windings 9 and 11 and auxiliary field windings 12 and 13. The several field windings are energized from the direct-current bus bars 14 and 15 which are connected to the generator 16.

The rheostat 21 comprises a resistor element 32 and a contact arm 33, and the rheostat 25 comprises a resistor element 34 and a contact arm 35. The contact arms 33 and 35 are connected by the shaft 36 to be operated together by means of the pilot motor 37 that is controlled by the switches 38 and 39 in accordance with the operation of the regulator 41. The regulator 41 is energized in accordance with the electrical quantity that is to be maintained constant and is illustrated as energized through the positive phase-sequence network 42 in accordance with the voltage of the power circuit 3, 4, 5. The pilot motor 37 comprises a field winding 43 that is connected between the supply-circuit conductors 14 and 15, and an armature winding 44 that is connected, by means of conductors 45 and 46, to the contact-carrying arms 47 and 48, respectively, of the switches 38 and 39. The conductor 45 may be connected to the supply conductor 14 through the contact arm 47, contact members 49 and conductor 51 upon the operation of the switch 38 to the proper circuit closing position. In the illustrated position of the switch, the conductor 45 is connected through the contact members 52 and conductor 53 to the supply conductor 15. The conductor 46 may be connected to the supply conductor 14 through the contact arm 48 of the switch 39, contact members 54 and conductor 55, upon the operation of the switch 39 to the proper circuit-closing position. In the illustrated position of the switch, the conductor 46 is connected, through contact members 56 and conductor 57, to the supply conductor 15.

The main winding 9 is connected in a circuit from the supply conductor 14, through the conductor 17, field winding 9, conductor 18, resistor 19, rheostat 21 and conductor 22, to the supply conductor 15. The main field winding 11 is connected, through a similar circuit and from the supply conductor 14, conductor 17, field winding 11, conductor 23, resistor 24, rheostat 25 and conductor 26, to the supply conductor 15. The auxiliary field windings 12 and 13 are connected in a circuit from the supply conductor 14, through conductor 17, field windings 12 and 13, conductor 27, resistor 28, conductor 29 and resistor 31, to the supply conductor 15.

The switches 38 and 39 are provided with biasing means 58 and 59, respectively, for biasing the contact arms to their illustrated circuit-closing positions and are provided with electromagnets having windings 61 and 62, respectively, that are energized in accordance with the operation of the regulator 41 to actuate the switches to their second circuit-closing positions. The switch 38 is actuated to its second operative position upon the energization of a circuit leading from the supply conductor 14, through conductor 63, contact-carrying arm 64, contact members 65 and 66, conductor 67, switch-operating winding 61 and conductor 53, to the supply conductor 15. The switch 39 is actuated to its second operative position upon the energization of a similar circuit which may be traced from the supply conductor 14, through conductor 63, contact-carrying arm 64, contact members 68 and 69, conductor 71, switch-operating winding 62 and conductor 57, to supply conductor 15.

The regulator 41 is provided with a biasing element 72 which opposes the action of an electromagnet energized by the winding 73 that is connected to the phase-sequence network 42.

The regulator system, in the embodiment illustrated, is responsive to the voltage of the transmission line 3, 4, 5 and, in order to ensure the proper response of the regulator on the occasion of a single-phase short-circuit, it is made responsive to the positive phase-sequence voltage of the line rather than to the single-phase voltage of a particular phase. This is desirable because, when a short circuit occurs on the transmission line, the voltage on one phase drops, but the voltage on one of the remaining phases may actually increase, so that the operation of the regulator might be such as to reduce the excitation rather than to increase the excitation, as desired. The particular phase-sequence network employed may be that particularly described in patent to C. T. Allcutt No. 1,571,224, of February 2, 1926 and assigned to the Westinghouse Electric & Manufacturing Company.

The positive phase-sequence network comprises two voltage transformers 74 and 75 connected, in open delta, to the transmission line 3, 4, 5. The two secondary windings of the voltage transformers are connected in such manner as to produce voltages that have 120° phase difference between them. These windings have a common connecting point 76, and the two phases 77 and 78 produce relatively leading and lagging currents, respectively. The leading phase 77 is provided with a resistor 79 connected in series therewith and the lagging phase 78 is provided with an impedance device 81 connected in series relation therewith and comprising an inductive reactor 82 and a resistor 83. The absolute value of the impedance of the device 81 is the same as that of the resistor 79, as pointed out in the above-mentioned patent to Allcutt. The terminals of the network are connected to the regulator winding 73 by means of the conductors 84 and 87 through an adjusting resistor 85.

The resistor 85 is connected, by means of conductors 86 and 87, to contact members 88 on the switch 38 through which a circuit is closed in shunt relation to the resistor upon the operation of the switch 38 to its second operative position. A resistor 89 is provided and is connected, in parallel-circuit relation, to the winding 73 by means of conductors 91 and 92 and the contact members 93 upon the operation of the switch 39 to its second operative position.

Upon the operation of the switch 38 to its second operative position, a circuit is closed in shunt relation to the resistor 28 through contact members 94. The resistor 31 is, in the illustrated position of the switch 39, shunted from the field-winding circuit by means of a circuit through the contact members 95 and conductors 96 and 57. Upon the operation of the switch 39 to its second operative position, the contact members 95 are disengaged and the resistor 31 is introduced into the circuit of the auxiliary field windings 12 and 13.

The regulator 41 is also provided with co-operating contact members 97 and 98 which are brought into engagement upon an abnormal decrease in the line voltage, or a greater decrease than that required to cause the contact members 65 and 66 to be brought into engagement. Upon such an abnormal decrease in the voltage of the power circuit, a circuit is completed from the supply conductor 14 by means of the conductor 63, contact arm 64, contact members 98 and 97, conductor 99, windings 101 and 102 of the relays 103 and 104, respectively, and by conductor 105 to the supply conductor 15. The closing of the circuit just traced causes the relays 103 and 104 to close circuits in shunt relation to the rheostats 25 and 21, respectively, so that the circuits through conductors 23 and 18 are continued through conductor 105 to the supply conductor 15.

The generator 16 is provided with an armature 106 that is connected to the supply conductors 14 and 15 and with a field winding 107 that is connected between these supply conductors, the circuit of which may include resistors 108 and 109. A normally open contactor 111 is shown connected in parallel-circuit relation to the resistor 108, and a normally closed contactor 112 is shown connected in parallel-circuit relation to the resistor 109. These contactors may, if desired, be operated similarly to the cooperating pairs of contact members 94 and 95, respectively, thereby varying the excitation of the field winding 107 similarly to that of the field windings 12 and 13 of the generator 7.

The operation of the regulator system is as follows. If the voltage of the power circuit 3, 4, 5, increases above its desired value, the energization of the winding 73 is increased to cause engagement of the contact members 68 and 69 and operation of the switch 39 to its second circuit-closing position. A circuit is thus completed from the supply conductor 14, through conductor 55, contact members 54, contact arm 48, conductor 46 upwardly through the armature 44, conductor 45, contact arm 47, contact members 52 and conductor 53, to the supply conductor 15, thus causing the motor 37 to operate in a direction to increase the resistance in circuit with the field windings 9 and 11, and thus decrease the excitation of the exciter generator 7 and of the main machine 1. The operation of the switch 39 to the described circuit-closing position causes the contact members 93 to engage and the contact members 95 to become disengaged. The contact members 93 close a circuit through the resistor 89 in shunt relation to the winding 73, thus decreasing the energization of this winding and causing disengagement of the contact members 68 and 69 prior to a complete correction of the line-circuit voltage, thus preventing the system from hunting. Disengagement of the contact members 95 causes the resistor 31 to be introduced into the circuit of the auxiliary field windings 12 and 13, thus decreasing their energization abruptly, or during the operation of the rheostats 21 and 25 to their new position. Means is thus provided for temporarily reducing the energization of the auxiliary field windings 12 and 13 during the interval in which the rheostats 21 and 25 are to be operated to reduce the energization of the main field windings 9 and 11.

If the voltages of the conductors 3, 4, 5 decrease below their desired value, the contact members 65 and 66 will be brought into engagement, thus operating the switch 38 to its second operative position and causing the operation of the motor 37 in a direction to increase the energization of the main field windings 9 and 11. This circuit may be traced from the supply conductor 14 through conductor 51, contact members 49, arm 47 of the armature winding 44, through conductor 46, contact members 56 and conductor 57, to the supply conductor 15.

The operation of the switch 38 to the described circuit-closing position causes engagement of the cooperating contact members 88 and of the cooperating contact members 94. The contact members 88 close a circuit through conductors 86 and 87 in shunt relation to the resistor 85, thus increasing the energization of the regulator winding 73 and causing the contact members 65 and 66 to become disengaged prior to a complete return of the voltage of the transmission line to its desired value, thus preventing hunting action in the system. The contact members 94 close a circuit in shunt relation to the resistor 28, thus increasing the energization of the auxiliary field windings 12 and 13 during the operation of the rheostats 21 and 25 in a direction to increase the energization of the main windings 9 and 11.

Should the voltage of the transmission line drop considerably below its desired value as may be the case upon occurrence of a ground or short circuit, the contact carrying arm 64 would move downwardly a sufficient distance to cause engagement of the contact members 97 and 98, thus causing the heavy contactors 103 and 104 to be operated to their circuit-closing positions and causing a rapid increase in the energization of the field windings 9 and 11.

Since the contactors 103 and 104 operate only infrequently, or upon a violent drop in the voltage of the transmission system, the circuit through the main field windings 9 and 11 are ordinarily varied gradually by the rheostats 21 and 25. Since the current carried by the auxiliary field windings 11 and 12, and the energy stored in these windings, is much less than that stored in the main field windings, there is comparatively little arcing upon disengagement of the cooperating pairs of contact members 94 and 95 to abruptly vary the energization of these windings.

Since many modifications may be made in the circuits and apparatus used within the spirit of my invention, I do not wish to be limited otherwise than by the scope of the appended claims.

I claim as my invention:

1. In a regulator system, a dynamo-electric machine having a plurality of cumulatively related field windings, a regulator actuated in accordance with an electrical quantity of said machine, means associated with certain of said field windings for gradually varying the energization thereof in accordance with the operation of said regulator, and means effective only during the operation of said last named means for abruptly varying the energization of certain other of said field windings.

2. In a regulator system, a dynamo-electric machine having a main field winding and an auxiliary field winding cumulatively related, a regulator actuated in accordance with an electrical quantity of said machine, means associated with said main field winding for gradually varying the energization thereof in accordance with the operation of said regulator, and means controlled by said regulator and effective to abruptly vary the energization of said auxiliary winding upon the operation of the last named means.

3. In a regulator system, a dynamo-electric machine having cumulatively related main and auxiliary field windings, a regulator actuated in accordance with an electric quantity of said dynamo-electric machine, a rheostat connected in series-circuit relation to said main field winding, means for operating said rheostat in accordance with the operation of said regulator to increase or decrease the excitation of said main field winding, and means controlled by said regulator for abruptly varying the resistance of the auxiliary field winding circuit during the operation of said rheostat in a direction corresponding to the direction of operation of the rheostat.

4. In a regulator system, a dynamo-electric machine having cumulatively related main and auxiliary field windings, a regulator actuated in accordance with an electrical quantity of said dynamo-electric machine, a rheostat connected in series-circuit relation to said main field winding and means for operating said rheostat in accordance with the operation of said regulator to increase or decrease the excitation of said main field winding, means controlled by said regulator for abruptly varying the resistance of the auxiliary field winding circuit during the operation of said rheostat in a direction corresponding to the direction of operation of the rheostat, and means actuated upon a predetermined variation in the regulated quantity from its desired value for short circuiting said rheostat.

5. In a regulator system, a dynamo-electric machine comprising a main field winding and an auxiliary field winding cumulatively related to the main field winding, regulator means normally operable for gradually varying the energization of said main field winding, means effective only during the operation of said last named means for abruptly varying the energization of said auxiliary field winding, and means operable under certain conditions of the system for rapidly varying the energization of said main field winding.

6. In a regulator system, a dynamo-electric machine having cumulatively related main and auxiliary field windings, a regulator actuated in accordance with an electrical quantity of said dynamo-electric machine, a rheostat connected in series-circuit relation to said main field winding, means for operating said rheostat in accordance with the operation of said regulator to increase or decrease the excitation of said main field winding, two resistors connected in series-circuit relation to said auxiliary field winding and a normally closed circuit in shunt relation to one of said resistors, means controlled by said rheostat-operating means for interrupting said normally closed circuit during the operation of said rheostat in a direction to decrease the energization of said main field winding, and means controlled by said rheostat-operating means for closing a circuit in shunt relation to the other of said two resistors during the operation of said rheostat in a direction to increase the energization of said main field winding.

7. In a regulator system, a dynamo-electric machine having cumulatively related main and auxiliary field windings, a regulator actuated in accordance with an electrical quantity of said dynamo-electric machine, a rheostat connected in series-circuit relation to said main field winding, means for operating said rheostat in accordance with the operation of said regulator to increase or decrease the excitation of said main field winding, two resistors connected in series-circuit relation to said auxiliary field winding and a normally closed circuit in shunt relation to one of said resistors, means controlled by said rheostat-operating means for interrupting said normally closed circuit during the operation of said rheostat in a direction to decrease the energization of said main field winding, means controlled by said rheostat-operating means for closing a circuit in shunt relation to the other of said two resistors during the operation of said rheostat in a direction to increase the energization of said main field winding, and means actuated upon a predetermined variation in the regulated quantity from its desired value for closing a circuit in shunt relation to said rheostat.

In testimony whereof, I have hereunto subscribed my name this 14th day of January 1930.

HOMER C. NYCUM.